UNITED STATES PATENT OFFICE.

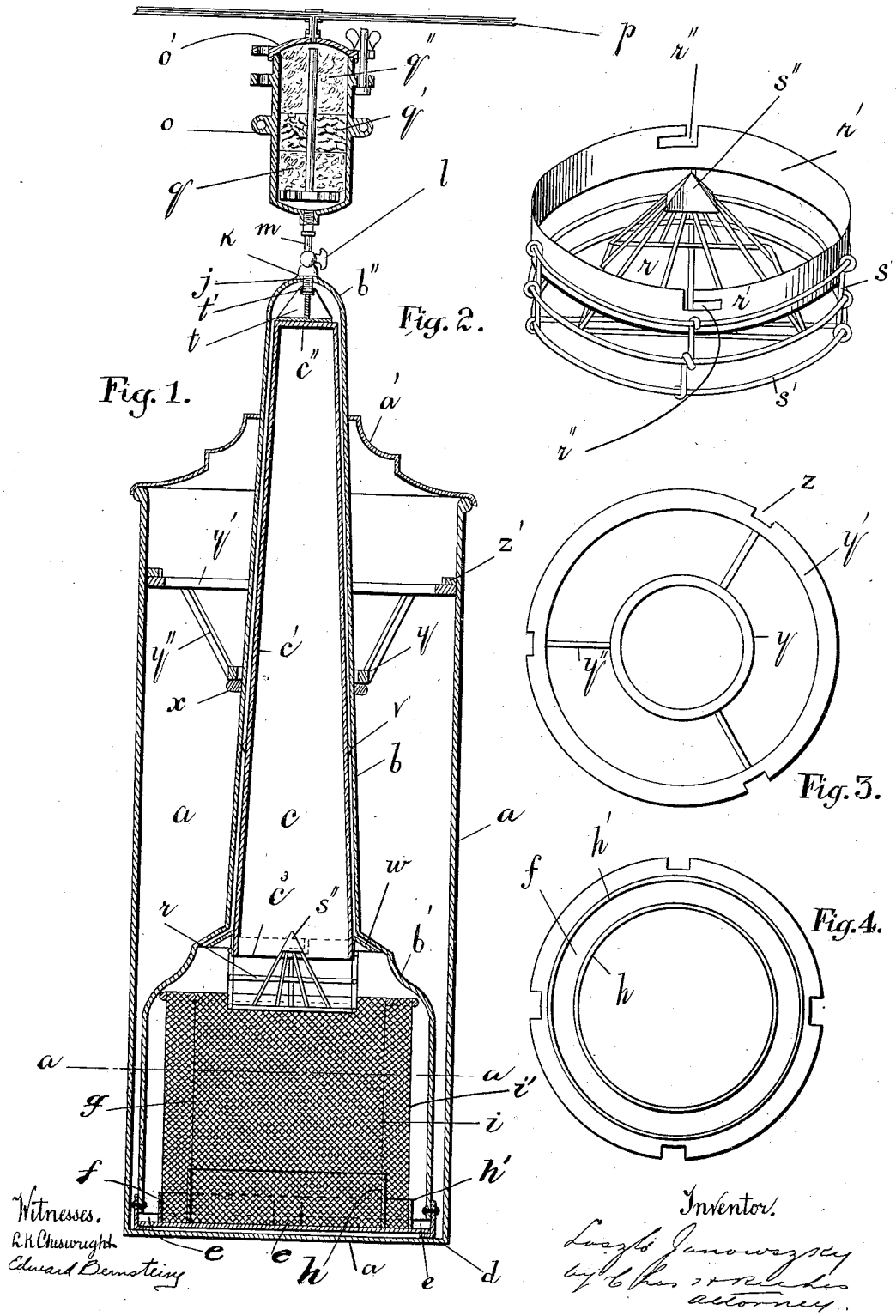

LASZLÓ JANOWSZKY, OF TORONTO, ONTARIO, CANADA.

ACETYLENE-GAS GENERATOR.

1,058,180.  Specification of Letters Patent.  Patented Apr. 8, 1913.

Application filed February 8, 1912. Serial No. 676,397.

*To all whom it may concern:*

Be it known that I, LASZLÓ JANOWSZKY, a subject of the King of Hungary, and resident of the city of Toronto, in the county of York and Province of Ontario, Dominion of Canada, have invented certain new and useful Improvements in Acetylene-Gas Generators; and I hereby declare that the following is a full, clear, and exact description of the same.

The object of my invention is to devise an acetylene gas generator in which the pressure of the gas within the gas tank can be utilized to automatically start and stop the generation of gas, and this object is attained by the construction hereinafter set forth and particularly pointed out in the claim.

In the drawings: Figure 1, is a vertical section of the generator showing the relative position of the various parts. Fig. 2, is a perspective view of the carbid holder. Fig. 3, is a plan view of the internal support for the gas cylinder, and Fig. 4, is a section on the line $a$—$a$ Fig. 1.

Like characters of reference refer to like parts throughout the specification and drawings.

The generator consists essentially of a cylindrical casing $a$ provided with a removable cover $a'$, a gas tank $b$ having an enlarged base $b'$, and a carbid magazine $c$ provided with a removable bottom or holder $r$. The gas tank $b$ is centrally contained within the cylindrical casing $a$ and extends through the removable cover $a'$, the bottom of its base $b'$ being provided with feet $d$ resting on the bottom of the cylindrical casing $a$ and holding the bottom of the gas tank $b$ slightly above that of the cylindrical casing, the wall of the base $b'$ being provided with apertures $e$ for the water to circulate into and out of the gas tank.

Supported upon the feet $d$ is the ash-holder $g$, comprising, as shown in Figs. 1 and 5, a bottom $f$ with two concentric and imperforate rings $h$, $h'$, extending vertically from the inner surface of the bottom $f$, the purpose of the rings $h$, $h'$ being to prevent the gas pressure within the gas tank, forcing the ashes contained in the ash-holder through the apertures $e$ into the cylindrical casing $a$. The rings $h$, $h'$ may be of the same height, but it is preferable to make the outside ring $h'$ of a lower height than the inside ring, as by doing so, it is possible for the gas pressure within the gas tank to force a part of the volume of water on the outside of the ring $h$ from the gas tank into the cylindrical casing, as hereinafter described, and thus increase the storage space for the gas.

Extending vertically from each of the rings $h$, $h'$, is a perforate plate or screen $i$, $i'$ respectively, the top edges of which are above the plane of the bottom of the carbid holder $r$. The gas tank $b$ is perfectly gas and air-tight when the cylindrical casing $a$ is filled or partly filled with water, and to provide for the generation and flow of the gas, a screw-threaded aperture $j$ is formed through its top $b''$, and inserted in the aperture $j$ is the screw-threaded stem $k$ of the gas cock $l$, connected by a short pipe $m$ with the gas purifier $o$.

The gas purifier is provided with a gas-tight cover $o'$ and has a connection with the gas mains $p$ to convey the gas to the burners of the lighting system. Within the gas purifier $o$ is a filter, consisting of a sponge $q$, a layer of charcoal $q'$, and a layer of cotton batting $q''$, the purpose of the sponge being to absorb the moisture from the gas as it passes from the gas cylinder to the gas mains, the purpose of the charcoal being to dry the gas after passing through the sponge, and the purpose of the cotton batting being to eliminate any particles of solid matter which may have passed through the sponge and charcoal, so that the gas, after passing through the purifier to the mains, will be, for all practical purposes, clean and dry.

The carbid magazine $c$, having a closed top $c''$ and an open bottom $c^3$, is substantially of corresponding shape, but of smaller dimensions than the gas tank, and is so suspended within the gas tank as to provide a chamber or duct for the passage of the gas to the stem of the gas cock. On the outer surface of the frusto-conical part $c'$ near its bottom edge, are pins $c^4$, as shown in Fig. 2, to connect the carbid holder $r$ to the bottom of the carbid magazine.

The carbid holder $r$ consists of a ring $r'$ of corresponding diameter to the bottom of the carbid magazine, and this ring $r'$ is provided with bayonet-joint slots $r''$ to receive the pins $c^4$ projecting from the outer surface of the carbid magazine and thus removably connect the carbid holder to the carbid magazine. Within the carbid holder is a centrally located pyramid $s''$, which, together with the sides $s$ and bottom $s'$ of the carbid holder, are of a wire basket formation, the purpose of which is to expose a relatively large surface of the carbid in the carbid holder, so that the water can obtain free access to it.

Riveted to the outer surface of the top of the carbid magazine is a connecting element $t$ having a screw-threaded ring $t'$ for connection with the screw-threaded stem $k$, by means of which the carbid magazine is held suspended within the gas tank.

To maintain its central relation with respect to the gas tank, the outer surface of the carbid magazine is provided with spacing members $v$ which engage the inner surface of the gas tank $b$ and thus insure an unobstructed passage for the gas. On the outer surface of the carbid magazine $c$ is a sloping collar $w$ located above the top of the carbid holder $r$ for the purpose of shedding from the carbid holder any condensation of the moisture carried into the gas tank by the gas.

Surrounding the gas tank $b$ is a resisting ring $x$ engaged by the lower ring $y$ of the support $y'$, the ring $y$ being connected to the support $y'$ by means of rods $y''$. In the support $y'$, as shown in Fig. 4, are peripheral slots $z$ to clear the stationary lugs $z'$ on the inner surface of the outer cylinder $a$ when the support is being placed in position. It is necessary to use a resisting support to prevent the gas pressure in the carbid magazine and gas tank lifting them out of the cylindrical casing.

In the use of the invention, the carbid magazine is charged with carbid previously treated with fat or fatty compounds to render it impervious to atmospheric humidity, and the carbid magazine with its holder, gas tank, and other related parts are then placed in position within the cylindrical casing $a$, the support $y'$ then, by means of the slots $z$, passing down below the lugs $z'$, until the ring $y$ engages with the resisting ring $x$, the support $y'$ then being turned to bring the slots $z$ out of line with the lugs $z'$. The cylindrical casing is then filled or partly filled with water and the cover $a'$ is then placed in position. Owing to the presence of air in the gas tank, the water is prevented by the air pressure coming into contact with the carbid in the carbid holder until the gas cock $l$ is opened. When the gas cock is opened, the air passes out of the gas tank through the purifier and into the gas mains, and when the burners are opened, escapes to the atmosphere. The water then rising in the base of the gas tank, comes into contact with the carbid in the carbid holder, and the generation of gas proceeds and continues while the gas cock remains open and the burners are taking gas. When the gas cock $l$ is closed or all of the burners are closed, the pressure of gas in the gas tank forces the water in its base through the apertures $e$ into the cylindrical casing and thus holding it away from the carbid in the carbid holder, prevents the further generation of gas until the gas cock has again been opened. In this way, I obtain an automatic control over the production of gas, which enables me to produce only sufficient for immediate consumption, thus enabling me to economize the use of the carbid and effect a corresponding reduction in the cost of illumination.

The water in the cylindrical casing $a$, not only provides for the generation of gas, but it also forms a seal to render the escape of the gas from the gas cylinder impossible, except through the gas cock $l$ to the purifier and mains.

Having thus fully described the nature of my invention, what I claim as new and desire to secure by Letters Patent, is:

In an acetylene gas generator, in combination, a carbid magazine, and a carbid holder therefor, said carbid holder comprising a reticulated ring of shape corresponding to the bottom of the carbid magazine, a reticulated bottom for said ring, and a centrally located reticulated pyramid supported upon said bottom, and means to detachably connect said carbid holder to the bottom of said carbid magazine.

Toronto, February 5th, 1912.

LASZLÓ JANOWSZKY.

Signed in the presence of—
  C. H. RICHES,
  LACI JANOWSZKY.